US009106504B1

(12) United States Patent
Lee et al.

(10) Patent No.: US 9,106,504 B1
(45) Date of Patent: Aug. 11, 2015

(54) METHODS AND APPARATUS FOR ALIGNING SIGNALS IN TRANSCEIVER CIRCUITRY

(71) Applicant: Altera Corporation, San Jose, CA (US)

(72) Inventors: Chiang Wei Lee, Gelugor (MY); Han Hua Leong, Butterworth (MY); Keen Yew Loke, Bayan Lepas (MY); Siew Leong Lam, Petaling Jaya (MY)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/055,063

(22) Filed: Oct. 16, 2013

(51) Int. Cl.
H04L 5/16 (2006.01)
H04L 25/40 (2006.01)

(52) U.S. Cl.
CPC ....................................... H04L 25/40 (2013.01)

(58) Field of Classification Search
CPC .......................... H04N 5/765; H04L 12/40013
USPC .................................. 375/219, 257, 259, 372
See application file for complete search history.

(56) References Cited

U.S. PATENT DOCUMENTS

| 7,099,278 | B2 | 8/2006 | Momtaz |
| 7,161,849 | B1* | 1/2007 | Lowe et al. .............. 365/189.05 |
| 7,519,747 | B1* | 4/2009 | Cory et al. ...................... 710/53 |
| 7,715,467 | B1* | 5/2010 | Burney ......................... 375/219 |
| 7,876,244 | B2 | 1/2011 | Brunner et al. |
| 8,433,958 | B2 | 4/2013 | Ding et al. |
| 8,514,634 | B1* | 8/2013 | Wu ......................... 365/189.011 |
| 2009/0074407 | A1* | 3/2009 | Hornbuckle et al. ........... 398/43 |
| 2013/0216014 | A1 | 8/2013 | Kong et al. |

* cited by examiner

Primary Examiner — Don N Vo

(57) ABSTRACT

Transceiver circuitry may include a storage element that receives data signals from an external element, an alignment detector circuit, and a register. The storage element has a write clock terminal that receives a channel clock signal and a read clock terminal that receives another channel clock signal. The alignment detector circuit is adapted to generate an asserted ready signal when a predefined pattern is detected in the received data signals. The register receives an output signal from the storage element and outputs the output signal based on the asserted ready signal that is generated by the alignment detector circuit. The register may be clocked by the same channel clock signal that is received at the read clock terminal of the storage element.

20 Claims, 6 Drawing Sheets

| K code | 8-bit code |
|---|---|
| K28.0 | 000 11100 |
| K28.1 | 001 11100 |
| K28.2 | 010 11100 |
| K28.3 | 011 11100 |
| K28.4 | 100 11100 |
| K28.5 | 101 11100 |
| K28.6 | 110 11100 |
| K28.7 | 111 11100 |
| K23.7 | 111 10111 |
| K27.7 | 111 11011 |
| K29.7 | 111 11101 |
| K30.7 | 111 11110 |

METHODS AND APPARATUS FOR ALIGNING SIGNALS IN TRANSCEIVER CIRCUITRY

BACKGROUND

Integrated circuit devices, such as field programmable gate array (FPGA) devices and application specific integrated circuits (ASICs), may perform a wide array of functions and as such, may be employed in different systems. When used in a larger system, an integrated circuit device may communicate with other external elements (e.g., another integrated circuit device, a memory module, etc.) via a variety of input-output standards.

Generally, an integrated circuit device may include input-output circuitry that is adaptable to support different operating speeds or input-output voltages. As performance requirements increase, integrated circuit devices need to be able to handle and process signals with increasingly high data rates (e.g., in excess of 40 Gigabits per second (Gbps)). High-speed transceiver (transmitter and receiver) channels in an integrated circuit are usually used to communicate with external circuits using different protocols.

Different transmission protocols such as single-ended and differential transmission systems are often used in transceiver circuitry. Compared to single-ended transmission, differential transmission (where a pair of signals of equal and opposite polarity is transmitted for every bit sent) may be less susceptible to noise, and as such, may be widely used.

An example of a differential system includes the Low Voltage Differential Signaling (LVDS) input-output standard. However, in a high-speed (e.g., a design running at a speed greater than 2 Gbps) multi-channel system where multiple transceiver channels are bonded together, receiver channel-to-channel skew (RCCS) may adversely affect the performance of the system.

It is within this context that the embodiments described herein arise.

SUMMARY

Circuitry and techniques for aligning signals in an integrated circuit are provided. It is appreciated that the present invention can be implemented in numerous ways, such as a process, an apparatus, a system, or a device. Several inventive embodiments of the present invention are described below.

Transceiver circuitry may include a storage element that receives data signals from an element (e.g., a circuit) that is external to the transceiver circuitry. The storage element has a write clock terminal that receives a channel clock signal and a read clock terminal that receives another channel clock signal. The transceiver circuitry may further include an alignment detector circuit and a register. The alignment detector circuit is adapted to generate an asserted ready signal when a predefined pattern is detected in the received data signals while the register is adapted to receive an output signal from the storage element. The register is clocked by the same channel clock signal that is received at the read clock terminal of the storage element and the register outputs the output signal from the storage element based on the asserted ready signal generated by the alignment detector circuit.

An integrated circuit may include a first receiver channel that receives a first input stream and a second receiver channel that receives a second input stream. The first and second receiver channels may generate their respective asserted ready signals when a predefined pattern is detected in the respective input streams. The integrated circuit further includes two registers. One of the registers receives an output from the first receiver channel while another receives an output from the second receiver channel. Both registers may receive the channel clock signal from a single receiver channel (e.g., either the first receiver channel or the second receiver channel).

A method of operating an integrated circuit may include receiving a first input stream from an off-chip element at a first receiver channel on the integrated circuit. A second input stream from the off-chip element may be received at a second receiver channel on the integrated circuit. The method further includes detecting a predefined pattern in the first and second input streams. When the predefined pattern is detected in the first input stream, an asserted ready signal may be generated for the first receiver channel. Accordingly, when the predefined pattern is detected in the second input stream, an asserted ready signal may be generated for the second receiver channel.

BRIEF DESCRIPTION OF THE DRAWINGS

FIG. 3B shows a table that lists the generally used K or "comma" codes and their respective 8-bit codes in accordance with embodiments of the present invention.

DETAILED DESCRIPTION

The embodiments provided herein include circuitry and techniques to compute a total latency value based on different delays associated with multiple circuit blocks in an integrated circuit (IC).

It will be obvious to one skilled in the art that the present exemplary embodiments may be practiced without some or all of these specific details. In other instances, well-known operations have not been described in detail in order not to unnecessarily obscure the present embodiments.

Figure 1:
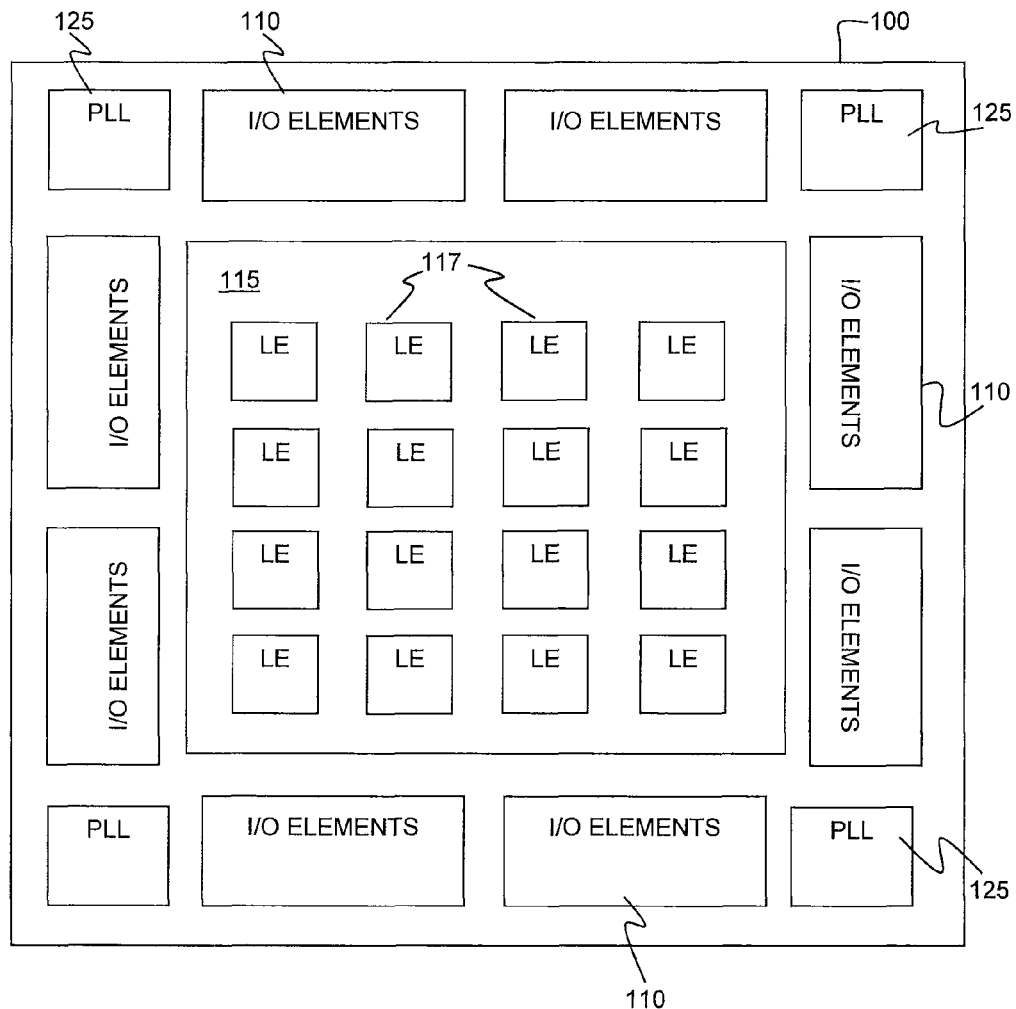
FIG. 1 is a block diagram of an illustrative integrated circuit in accordance with embodiments of the present invention.

An IC device such as a field-programmable gate array (FPGA) device, generally includes high-speed input-output circuitry, including, among others, transceiver channels. FIG. 1, meant to be illustrative and not limiting, shows a block diagram of IC 100 that can implement embodiments of the present invention. Generally, an IC device such as IC 100 includes core logic region 115 and input-output elements 110. Other auxiliary circuits, such as phase-locked loops (PLLs) 125 for clock generation and timing, can be located outside the core logic region 115 (e.g., at corners of IC 100 and adjacent to input-output elements 110).

Core logic region 115 may be populated with logic cells that include "logic elements" (LEs) 117, among other circuits. LEs 117 may include look-up table-based logic regions and may be grouped into "Logic Array Blocks" (LABs). LEs 117 and groups of LEs or LABs can be configured to perform logical functions desired by the user. Configuration data loaded into configuration memory can be used to produce control signals that configure LEs 117 and groups of LEs and LABs to perform the desired logical functions. Signals received from external circuitry at input-output elements 110 may be routed from input-output elements 110 to core logic region 115 and other logic blocks on IC 100. Core logic region 115 and other logic blocks on IC 100 may accordingly perform functions based on the signals received.

Signals may be sent from core logic region 115 and other relevant logic blocks of IC 100 to other external circuitry or components that may be connected to IC 100 through input-output elements 110. A single device like IC 100 can potentially support a variety of different interfaces and each individual input-output bank 110 can support a different input-output standard with a different interface or protocol (e.g., high-speed serial interface protocol).

In the embodiment of FIG. 1, input-output elements 110 may include input-output buffers and high-speed transmitter/receiver circuitry that connect IC 100 to other external components. A transceiver channel may generally be divided into two blocks (both not shown in FIG. 1), such as a physical coding sublayer (PCS) block and a physical medium attachment (PMA) block. The PCS block is a block that is located between the core region of the device (e.g., core region 115) and the PMA block. The PCS may include, among others, decoders, encoders, alignment circuitry, and registers such as first-in-first-out (FIFO) storage blocks. The PMA block generally connects the IC device (e.g., IC 100) to the channel, generates the required clocks, and converts data from parallel to serial (and from serial to parallel).

In a high-speed multi-channel system where multiple transceiver channels are bonded together, receiver channel-to-channel skew (RCCS) may adversely affect the performance of the system. As is generally known, receiver RCCS is the timing difference between the fastest and slowest input transitions of the received signals, including possible timing variations and clock skew. Transceiver circuitry with bonded channels (e.g., a multi-channel Low Voltage Differential Signaling (LVDS) system or other similar systems) may therefore need to deskew or align the received signals at the bonded channels.

Figure 2:
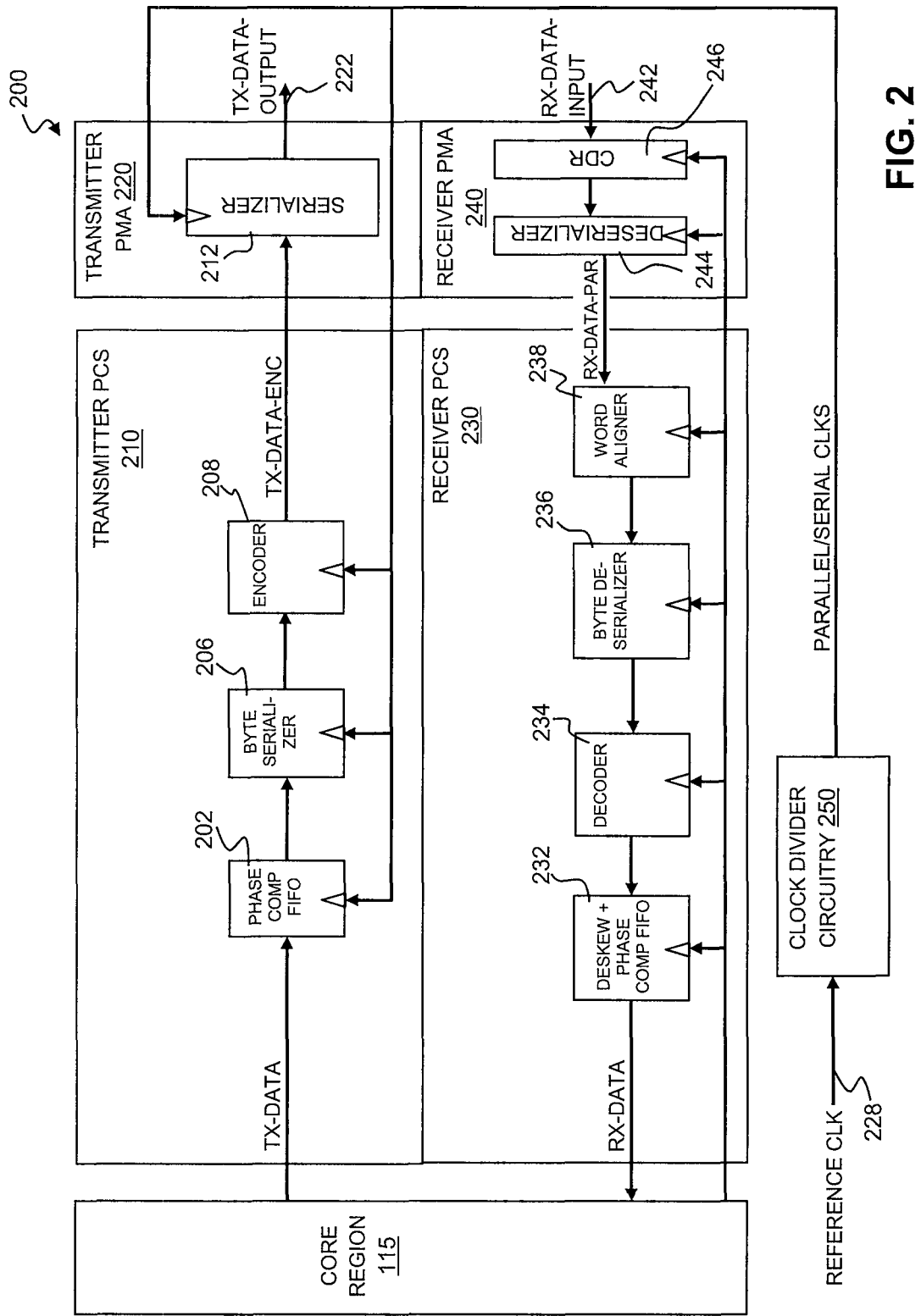
FIG. 2 shows illustrative transceiver circuitry in accordance with one embodiment of the present invention.

FIG. 2 shows illustrative transceiver circuitry 200 in accordance with one embodiment of the present invention. Transceiver circuitry 200 may include transmitter circuitry that includes transmitter PCS block 210 and transmitter PMA block 220, and receiver circuitry that includes receiver PCS block 230 and receiver PMA block 240. Different circuit blocks within transmitter PMA block 220 and transmitter PCS block 210 may receive clock signals from clock divider circuitry 250. In the embodiment of FIG. 2, clock divider circuitry 250 may receive a reference clock signal such as REFERENCE CLK 228 from a PLL circuit (e.g., PLL 125 of FIG. 1).

The reference clock signal, REFERENCE CLK 228, may then be divided by clock divider circuitry 250 to produce parallel and serial clock signals, PARALLEL/SERIAL CLKS. Accordingly, circuit blocks within the transmitter circuitry may be clocked by the parallel or serial clock signal from clock divider circuitry 250. For example, serializer 212 in transmitter PMA block 220 may receive both the parallel and serial clock signals, PARALLEL/SERIAL CLKS, from clock divider circuitry 250 while circuit blocks within transmitter PCS block 210 such as phase compensation FIFO 202, byte serializer circuit 206 and encoder circuit 208 may be clocked by the parallel clock signal, PARALLEL CLK, from clock divider circuitry 250.

In one embodiment, transceiver circuitry 200 may be input-output circuitry on an IC device such as IC 100 of FIG. 1. As an example, when the IC device is transmitting a data packet, the data packet TX-DATA may travel from core region 115 to transmitter PCS block 210. As shown in FIG. 2, transmitter PCS block 210 may include phase compensation FIFO 202, byte serializer 206, and encoder circuit 208. The data packet TX-DATA may thus be first received by phase compensation FIFO 202 that interfaces with core region 115 (or more specifically, the protocol interface within core region 115). Phase compensation FIFO 202 may compensate for the phase difference between a low-speed parallel clock signal from clock divider circuitry 250 and a clock signal that it receives from core region 115 (not shown).

The data packet may then be transmitted from phase compensation FIFO 202 to byte serializer circuit 206. Byte serializer circuit 206, when enabled, divides the input datapath width by two to allow transmitter channel operation at higher data rates while meeting the maximum frequency limit of core region 115. As an example, the maximum frequency of core region 115 may not exceed 200 megahertz (MHz). In such a scenario, the transmitter channel may not operate at 3.125 gigabit per second (Gbps) with a byte serializer as the frequency of the core region would exceed its maximum frequency limit (3.125 Gbps/10=312.5 MHz). A byte serializer is needed in this scenario to allow the transmitter channel to operate at 3.125 Gbps without violating the maximum frequency limit of its core region (3.125 Gbps/20=156.25 MHz).

As certain protocols may require the outgoing data to be encoded, encoder circuit 208 in transmitter PCS block 210 may be used to encode the outgoing data. In one embodiment, encoder circuit 208 may implement padded encoding algorithms that add additional bits to the data packet received from byte serializer circuit 206 to generate the outgoing data packet. Examples of such padded encoding algorithms include 8 B/10 B encoding that generates 10-bit code groups from 8-bit data, 64 B/66 B encoding that generates 66-bit code groups from 64-bit data, and 128 B/130 B encoding that generates 130-bit code groups from 128-bit data.

Data packet TX-DATA may be received at the input of the transmitter PCS block 210, and an outgoing data packet TX-DATA-ENC may be transmitted from the transmitter PCS block 210 to transmitter PMA block 220. The data packet TX-DATA-ENC is serialized by serializer 212 in transmitter PMA block 220 and transmitted externally as TX-DATA-OUTPUT 222. It should be noted that specific operations and clock signals involved in the processing of data packet TX-DATA prior to transmission as data packet TX-DATA-OUTPUT are not described in detail herein in order to not unnecessarily obscure the present invention. It should also be noted that alternative embodiments, not described herein, can omit some of the processing steps for processing the data packet TX-DATA described herein, or include processing steps in addition to the processing steps for processing the data packet TX-DATA described herein.

When the IC device is receiving a data packet from an off-chip element that is coupled to the IC device, such as RX-DATA-INPUT 242, the received data packet is first processed in receiver PMA block 240. Receiver PMA block 240 includes clock data recovery (CDR) circuit 246 and deserializer 244. CDR circuit 246 is used to lock the received data packet RX-DATA-INPUT 242 (with its accompanying clock signal that is not shown in FIG. 2) to REFERENCE CLK 228.

As the received data packet RX-DATA-INPUT may contain serial data, the serial data is subsequently converted to parallel data RX-DATA-PAR by deserializer circuit 244. The parallel data RX-DATA-PAR is then transmitted to receiver PCS block 230.

In the embodiment of FIG. 2, receiver PCS block 230 may include word aligner circuit 238, byte deserializer circuit 236, decoder circuit 234, and deskew and phase compensation FIFO 232. Word aligner circuit 238 may be used to restore the word boundary of the parallel data RX-DATA-PAR it receives from deserializer circuit 244 based on a pre-defined alignment pattern (e.g., different protocols may have their respective word alignment patterns). As the data packet RX-DATA-INPUT is deserialized at receiver PMA 240, the data may lose the word boundary of its upstream transmitter after the deserilization. Byte deserializer circuit 236 reduces the speed that core region 115 must run at in order to meet performance of the received data packet.

As certain protocols may require serial data to be encoded, decoder circuit 234 in receiver PCS block 230 may be needed to decode the received data before forwarding the data to the upper layers of the receiver circuitry for packet processing. The decoded data may subsequently be transmitted from decoder circuit 234 to deskew and phase compensation FIFO 232. In general, the phase compensation FIFO in each transceiver channel may ensure the reliable transfer of data and status signals between receiver PCS block 230 and receiver PMA block 240, and core region 115 of the IC device.

However, as multiple transceiver channels such as transceiver channel circuitry are bonded together, data received at each of the bonded transceiver channels may be skewed. For example, data packets may arrive at different transceiver channels at different times, causing RCCS. As such, in the embodiment, of FIG. 2, deskew and phase compensation FIFO 232 is a phase compensation FIFO with deskew capabilities to align potentially out-of-sync data at multiple bonded transceiver channels before transmitting the aligned data RX-DATA to core region 115 for further processing.

Figure 3A:
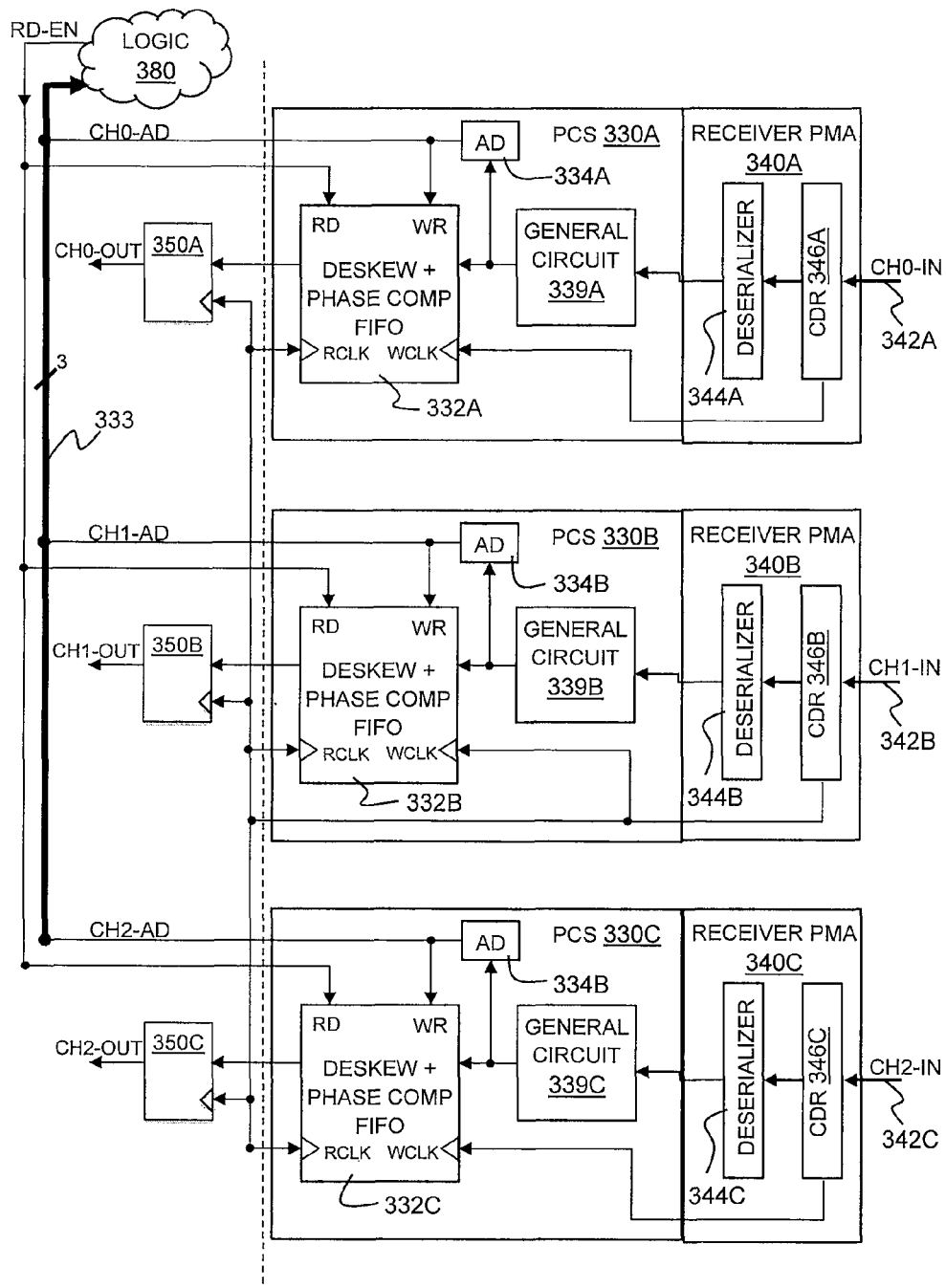
FIG. 3A shows multiple bonded receiver channels with deskew and phase compensation first-in-first-out (FIFO) storage elements in accordance with embodiments of the present invention.

FIG. 3A shows multiple bonded receiver channels with deskew and phase compensation FIFOs in accordance with embodiments of the present invention. It should be noted that receiver channels that are coupled together (as shown in the illustrative example of FIG. 3A) may be referred to as "bonded" receiver channels. In the embodiment of FIG. 3A, each receiver channel includes a receiver PMA block (receiver PMA blocks 340A-340C, respectively), and a receiver PCS block (receiver PCS blocks 330A-330C, respectively). Each of the bonded receiver channels receives an input stream (shown respectively as input data streams CH0-IN, CH1-IN, and CH2-IN) at its own input terminal (shown respectively as input terminals 342A-342C).

Input data streams CH0-IN, CH1-IN and CH2-IN are processed by the respective receiver PMA blocks 340A-340C. It should be appreciated that FIG. 3A shares similarities with FIG. 2 and as such, for the sake of brevity, elements that have been described earlier (these elements are shown with the same reference numerals plus 100, such as CDR circuits 346A-346C and deserializer circuits 344A-344C in receiver PMA blocks 340A-340C) are not described in detail again.

After the input data streams CH0-IN, CH1-IN, and CH2-IN are deserialized by the respective deserializer circuits 344A-344C, the deserialized data streams are transmitted to their respective receiver PCS blocks 330A-330C. The deserialized data streams may be received and processed by general circuit blocks 339A-339C in each of the receiver PCS circuits 330A-330C. As shown in FIG. 2, apart from deskew and phase compensation FIFO 232, receiver PCS block 230 may include decoder circuit 234, byte deserializer circuit 236, and word aligner circuit 238. Accordingly, each of general circuit blocks 339A-339C may include any or all of these circuits. Generally, the input streams CH0-IN, CH1-IN and CH2-IN may arrive at their respective receiver channels at different times. As such, the received input streams may not be properly aligned with each other (i.e., they may be out of sync with each other).

In one embodiment, each deskew and phase compensation FIFO 332A-332C has a write clock terminal WCLK and a read clock terminal RCLK. Each transceiver channel (or more specifically, as shown in FIG. 3A, each receiver channel) may have its own channel clock signal. In the illustrative example of FIG. 3A, CDR circuit 346A-346C in each receiver channel may generate the channel clock signal for that particular receiver channel. The write clock terminals WCLK of the respective deskew and phase compensation FIFOs 332A-332C may receive their own channel clock signal. This allows deskew and phase compensation FIFOs 332A-332C to be clocked by its own channel clock signal when receiving input streams (that may arrive at different times) from an off-chip element.

In one embodiment, the input streams CH0-IN, CH1-IN and CH2-IN at the respective receiver channels may include a predefined pattern. The predefined pattern may be a user-defined pattern or may be a pattern that may include control words or "commas" that are used for transmitting control information such as idle characters, test data or data delimiters, depending on the input-output protocol used. It should be noted that some of the commonly used K or "comma" codes and their respective 8-bit codes are shown in FIG. 3B (details of which are not described herein in order to not unnecessarily obscure the present invention).

Accordingly, alignment detectors 334A-334C in FIG. 3A in the respective receiver channels may include circuitry that is adapted to detect the predefined pattern in the respective input streams. When the predefined pattern is detected in an input stream at a particular receiver channel, its alignment detector (either one of alignment detectors 334A-334C) may output an asserted alignment detected signal. In the embodiment of FIG. 3A, alignment detectors 334A-334C output the respective alignment detected signals CH0-AD, CH1-AD and CH2-AD.

As shown in FIG. 3A, the asserted alignment detected signals CH0-AD, CH1-AD and CH2-AD are transmitted to logic circuitry 380 (via a 3-bit bus 333) and the write enable terminal, WR, of the respective deskew and phase compensation FIFOs 332A-332C. Accordingly, as the predefined pattern is detected by any of the alignment detectors (e.g., either alignment detector 334A, 334B or 334C), that particular deskew and phase compensation FIFO may be enabled such that data from that particular input stream may be written to and stored in it.

In one embodiment, data from the input stream at any receiver channel is stored in that channel's deskew and phase compensation FIFO until the read enable RD terminal of that deskew and phase compensation FIFO is enabled. Logic circuitry 380 may be used to control when data may be read from any of the deskew and phase compensation FIFOs 332A-332C. As an example, logic circuitry 380 may generate an asserted read enable signal RD-EN once asserted alignment detected signals CH0-AD, CH1-AD and CH2-AD are received from the respective receiver channels. In other words, logic circuitry 380 may generate the asserted read enable signal RD-EN when the predefined pattern has been detected in each of the bonded receiver channels. It should be noted that logic circuitry 380 may reside in the core region of the IC device and may include state machines or logic elements that are adapted to generate the asserted read enable signal RD-EN based on the asserted alignment detected signals CH0-AD, CH1-AD and CH2-AD. The read enable signal RD-EN may accordingly be transmitted to the read enable terminal RD of each of the deskew and phase compensation FIFOs 332A-332C. Data stored in each of the deskew and phase compensation FIFOs 332A-332C may thus be read and transmitted out of the respective FIFOs.

In one embodiment, the data stored in the respective deskew and phase compensation FIFOs 332A-332C is transmitted to respective storage elements 350A-350C. As shown in FIG. 3A, the respective read clock terminals RCLK of deskew and phase compensation FIFOs 332A-332C, and the clock terminals of the respective storage elements 350A-350C, may receive the same clock signal. In this case, all the read clock terminals RCLK and the clock terminals of storage elements 350A-350C receive the channel clock signal generated by CDR circuit 346B of receiver PMA block 340B.

Generally, a channel clock signal from any of the bonded receiver channels may be coupled to the read clock terminals RCLK of the respective deskew and phase compensation FIFOs 332A-332C (and the clock terminals of storage elements 350A-350C). In one embodiment, when multiple in an array of receiver channels are coupled together, the channel clock signal from the middle receiver channel in that array of receiver channels may be used to clock the read clock terminals of their respective deskew and phase compensation FIFOs (and the clock terminals of the storage elements coupled to the respective deskew and phase compensation FIFOs). In general, sharing the same channel clock signal and transmitting the data stored in deskew and phase compensation FIFOs 332A-332C in the respective storage elements 350A-350C allow the data from each receiver channel, which may arrive at each receiver channel at different times, to be transmitted synchronously to other circuitry within the IC device (not shown in FIG. 3A). As such, the input streams received at each of the receiver channels may be transmitted synchronously by storage elements 350A-350C as output streams CH0-OUT, CH1-OUT and CH2-OUT, respectively, to other circuits (not shown) in the device.

Figure 4A:
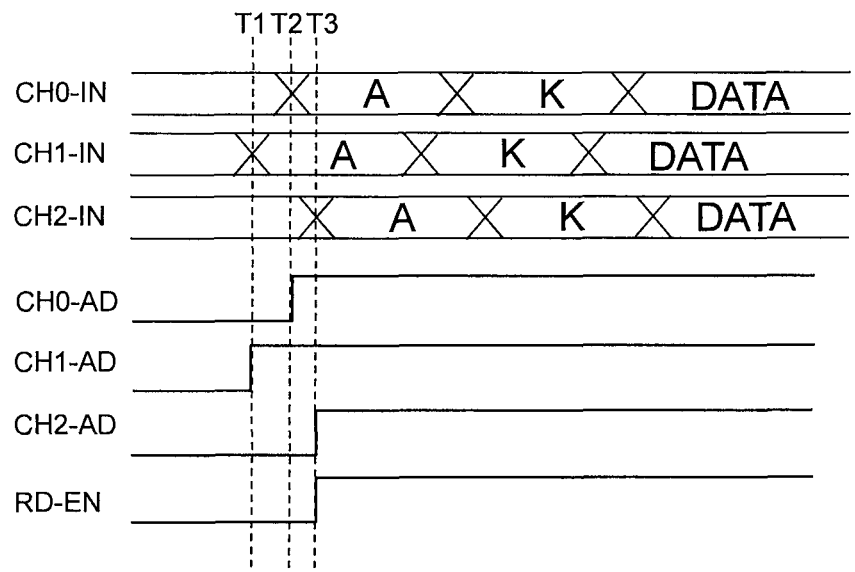
FIG. 4A depicts illustrative waveforms of the relevant input and output signals of multiple bonded receiver channels in accordance with one embodiment of the present invention.

FIG. 4A depicts illustrative waveforms of the relevant input and output signals of multiple bonded receiver channels in accordance with one embodiment of the present invention. FIG. 4A shows input streams CH0-IN, Ch1-IN and CH2-IN, together with the respective alignment detected signals CH0-AD, CH1-AD and CH2-AD, and read enable signal RD-EN. Each input stream (CH0-IN, CH1-IN and CH2-IN) includes a predefined pattern A followed by a control word K and DATA signals. The predefined pattern A may represent the beginning of the input stream (e.g., a predefined 10-bit pattern) while the control word K may be an 8-bit code (e.g., K28.5, K28.7, etc., as shown in the table of FIG. 3B). It should be noted that different K or "comma" codes may be supported by an IC device depending on the input-output protocol used (details of which are not described herein in order to not obscure the present invention).

As shown in FIG. 4A and as described above with reference to FIG. 3A, the input streams, CH0-IN, CH1-IN and CH2-IN arrive at different times at the respective receiver channels. The respective alignment detected signals at the different receiver channels may be asserted at different times according to the arrival of the predefined pattern A at each of the input streams CH0-IN, CH1-IN and CH2-IN. In FIG. 4A, the predefined pattern A is detected in input stream CH1-AD at time T1 and the corresponding alignment detected signal CH1-AD is asserted (e.g., set to a logic high level) at time T1. Accordingly, alignment detected signals CH0-AD and CH2-AD are asserted at times T2 and T3, respectively, when the predefined pattern A is detected at the respective input streams CH0-IN and CH2-IN. When the predefined pattern A has been detected in all of the bonded channels (assuming three channels are bonded together in this example) the read enable signal RD-EN is asserted at time T3 by logic circuitry 380 of FIG. 3A and subsequently transmitted to the read enable terminals of the respective deskew and phase compensation FIFOs 332A-332C. At this stage, DATA signals from each of the input streams CH0-IN, CH1-IN and CH2-IN that are stored in the respective deskew and phase compensation FIFOs 332A-332C may be read out of the FIFOs.

Figure 4B:
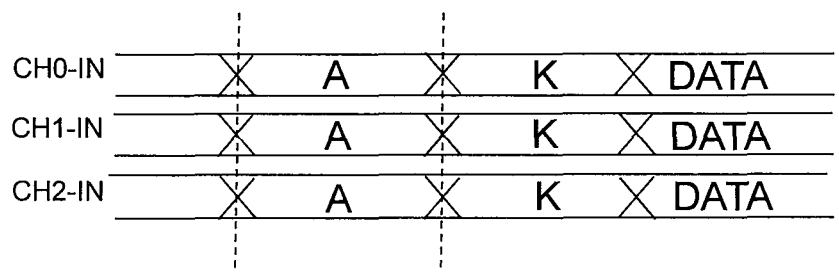
FIG. 4B depicts illustrative waveforms of output signals from multiple bonded receiver channels in accordance with one embodiment of the present invention.

FIG. 4B depicts illustrative waveforms of the output signals of multiple bonded receiver channels in accordance with one embodiment of the present invention. The output streams CH0-OUT, CH1-OUT and CH2-OUT may be outputs from storage elements 350A, 350B and 350C, respectively, in FIG. 3A. As explained above and as shown in FIG. 4B, the output streams CH0-OUT, CH1-OUT and CH2-OUT are transmitted out of the respective storage elements 350A, 350B and 350C after the read enable signal RD-EN has been asserted at time T3 as shown in FIG. 4A. As the storage elements 350A-350C (as shown in FIG. 3A) are clocked by the same channel clock signal from CDR circuit 346B, the output streams CH0-OUT, CH1-OUT and CH2-OUT are aligned with each other, as shown in the output waveforms in FIG. 4B. As such, as described with reference to FIGS. 3, 4A and 4B, having a read enable terminal RD in the deskew and phase compensation FIFOs that is controlled at least in part by the read enable signal RD-EN (which is in turn generated based on the assertion of alignment detected signals CH0-AD, CH1-AD and CH2-AD) allows input streams CH0-IN, CH1-IN and CH2-IN at different receiver channels to be deskewed or realigned before being transmitted to other circuitry for further processing.

Figure 5:
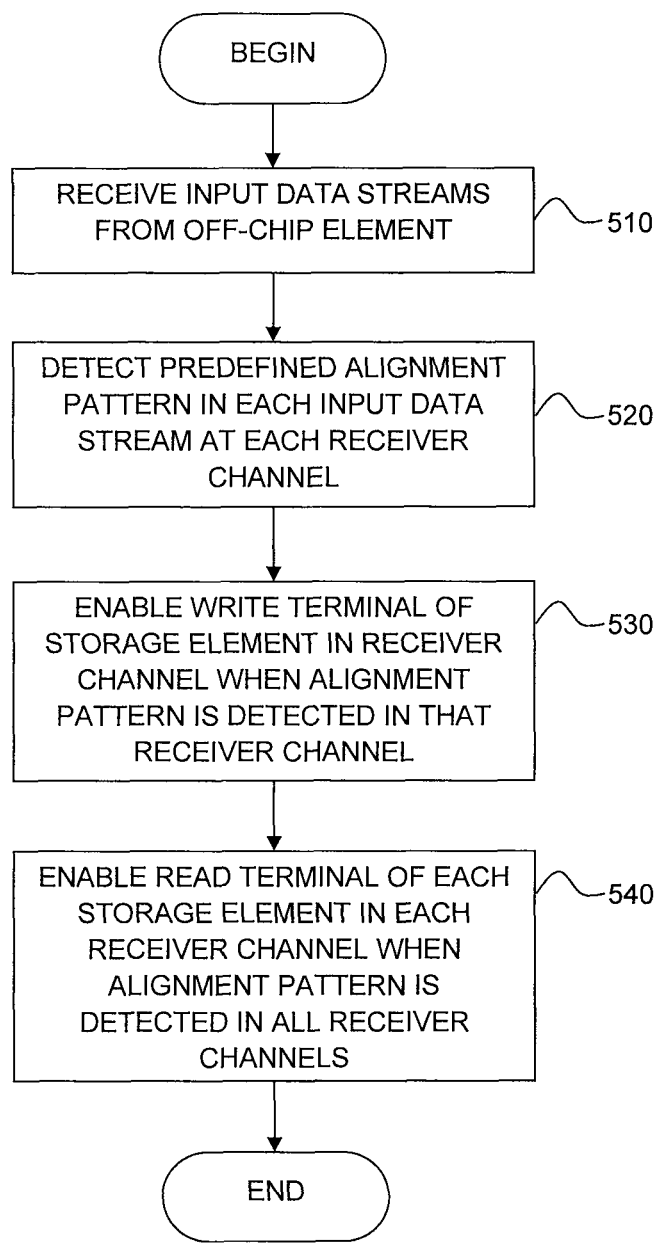
FIG. 5 shows illustrative method steps to operate an integrated circuit with bonded transceiver channels in accordance with embodiments of the present invention.

FIG. 5 is a flow diagram 500 illustrating method steps for deskewing bonded transceiver channels in an IC, in accordance with one embodiment. As an example, the bonded transceiver channels may be similar to those described with reference to the bonded receiver channel circuitry shown in FIG. 3A. At step 510, input data streams are received. For example, the input data streams can be received from an off-chip element (e.g., another IC device, a memory module, etc.). Different input data streams may be received at the respective bonded transceiver channels at different times, i.e., the input data streams received at each of the bonded transceiver channels can be skewed with respect to each other. At step 520, a predefined alignment pattern in each of the input data streams is detected at each of the bonded receiver channels. It should be noted that the predefined alignment pattern may be a user-defined pattern or may depend on the input-output protocol employed for that particular transmission. As shown in FIG. 3A, alignment detectors 334A-334C in the respective receiver channels are used to detect the predefined pattern in the respective input data streams CH0-IN, CH1-IN and CH2-IN.

At step 530, a write terminal of a storage element (e.g., a FIFO storage) in any of the bonded transceiver channels is enabled when the alignment pattern is detected in that particular receiver channel. It should be noted that data (in this case, input data stream received at that particular receiver channel) may be written to and stored in the storage element when its write terminal is enabled. For instance, in FIG. 3A, when alignment detector circuit 334A detects the predefined pattern in input data stream CH0-IN, it generates an asserted alignment detected signal CH0-AD that is subsequently transmitted to the write enable terminal WR of deskew and phase compensation FIFO 332A (CH0-AD is also transmitted to logic circuitry 380).

At step 540, the read terminal of each of the storage elements in each of the bonded receiver channels is enabled when the alignment pattern is detected in all receiver channels. In the embodiment of FIG. 3A, logic circuitry 380 generates an asserted read enable signal RD-EN based on the assertion of all the alignment detected signals (as shown by the output waveform of the RD-EN signal in FIG. 4A), CH0-AD, CH1-AD and CH2-AD, to enable the read terminals of the respective deskew and phase compensation FIFOs 332A-332C. Accordingly, at this stage, input data stored in the storage elements may be read and transmitted out of the respective bonded receiver channels.

It is noted that even the embodiments described above have been described with respect to programmable logic circuits, the methods and apparatus described herein may be advantageously incorporated into any suitable integrated circuit. For example, these method and apparatus may also be incorporated into numerous types of devices such as microprocessors or other integrated circuits. Other examples of such integrated circuits include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. Transceiver circuitry that receives data signals, comprising:
   a storage element having a write clock terminal that receives a first channel clock signal and having a read clock terminal that receives a second channel clock signal, wherein the storage element further receives the data signals;
   an alignment detector circuit that generates an asserted ready signal in response to detecting a predefined pattern in the data signals; and
   a register that receives an output signal from the storage element, wherein the register has a clock terminal that receives the second channel clock signal and wherein the register outputs the output signal based at least in part on the asserted ready signal.

2. The transceiver circuitry defined in claim 1, wherein the storage element further comprises a write enable terminal that receives the asserted ready signal from the alignment detector circuit.

3. The transceiver circuitry defined in claim 1, wherein the storage element further comprises a read enable terminal that receives an enable signal, and wherein the storage element outputs the output signal in response to assertion of the enable signal.

4. The transceiver circuitry defined in claim 3, wherein the transceiver circuitry further receives additional data signals and further comprises:
   an additional storage element that receives the additional data signals, wherein the additional storage element has read and write clock terminals that receive the second channel clock signal;
   an additional alignment detector circuit that generates an additional asserted ready signal in response to detecting the predefined pattern in the additional data signals; and
   an additional register that receives an additional output signal from the additional storage element and that receives the second channel clock signal.

5. The transceiver circuitry defined in claim 4, wherein the additional storage element comprises a read enable terminal that receives the enable signal, and wherein the additional storage element outputs the additional output signal in response to assertion of the enable signal.

6. The transceiver circuitry defined in claim 4, wherein the additional storage element comprises a write enable terminal that receives the additional asserted ready signal from the additional alignment detector circuit.

7. The transceiver circuitry defined in claim 4 further comprising:
   first clock data recovery circuitry that generates the first channel clock signal; and
   second clock data recovery circuitry that generates the second channel clock signal.

8. The transceiver circuitry defined in claim 1, wherein the storage element comprises a first-in-first-out (FIFO) storage element.

9. An integrated circuit, comprising:
   a first receiver channel circuit that receives a first input stream and that generates a first asserted ready signal in response to detecting a predefined pattern in the first input stream;
   a second receiver channel circuit that receives a second input stream and that generates a second asserted ready signal in response to detecting the predefined pattern in the second input stream;
   a first register that receives an output and a channel clock signal from the first receiver channel circuit; and a second register that receives an output from the second receiver channel and that receives the channel clock signal from the first receiver channel circuit.

10. The integrated circuit defined in claim 9, wherein the first receiver channel circuit comprises a first clock data recovery circuit that generates the channel clock signal, and wherein the second receiver channel circuit comprises a second clock data recovery circuit that generates an additional channel clock signal.

11. The integrated circuit defined in claim 10 further comprising:
a first storage element in the first receiver channel circuit that receives the first input stream;
a second storage element in the second receiver channel circuit that receives the second input stream;
a first alignment detector circuit in the first receiver channel circuit that generates the first asserted ready signal in response to detecting the predefined pattern in the first input stream; and
a second alignment detector circuit in the second receiver channel circuit that generates the second asserted ready signal in response to detecting the predefined pattern in the second input stream.

12. The integrated circuit defined in claim 11, wherein the first storage element comprises a first write clock terminal that receives the channel clock signal, and wherein the second storage element comprises a second write clock terminal that receives the additional channel clock signal.

13. The integrated circuit defined in claim 12, wherein the first storage element further comprises a first read clock terminal that receives the channel clock signal, and wherein the second storage element further comprises a second read clock terminal that receives the channel clock signal.

14. The integrated circuit defined in claim 11, wherein the first storage element comprises a first write enable terminal that receives the first asserted ready signal, wherein the first storage element stores the first input stream in response to assertion of the first ready signal, wherein the second storage element comprises a second write enable terminal that receives the second asserted ready signal, and wherein the second storage element stores the second input stream in response to assertion of the second ready signal.

15. The integrated circuit defined in claim 14, wherein the first storage element includes a first read enable terminal, wherein the second storage element includes a second read enable terminal, and wherein the first and second read enable terminals receive an asserted read enable signal based at least in part on the first and second asserted ready signals.

16. A method of operating an integrated circuit comprising:
receiving a first input stream from off-chip circuitry at a first receiver channel on the integrated circuit;
receiving a second input stream from the off-chip circuitry at a second receiver channel on the integrated circuit;
detecting a predefined pattern in the first and second input streams;
in response to detecting the predefined pattern in the first input stream, generating a first asserted ready signal for the first receiver channel; and
in response to detecting the predefined pattern in the second input stream, generating a second asserted ready signal for the second receiver channel.

17. The method defined in claim 16, wherein the first receiver channel comprises a first first-in-first-out (FIFO) storage element, and wherein the second receiver channel comprises a second FIFO storage element, the method further comprising:
in response to detecting the predefined pattern in the first input stream, storing the first input stream in the first FIFO storage element; and
in response to the detecting the predefined pattern in the second input stream, storing the second input stream in the second FIFO storage element.

18. The method defined in claim 17, wherein the first and second FIFO storage elements comprise respective read clock terminals, the method further comprising:
with clock data recovery circuitry in the first receiver channel, generating a clock signal; and
transmitting the clock signal to the read clock terminals of the first and second FIFO storage elements.

19. The method defined in claim 18, further comprising:
generating an asserted read enable signal in response to assertion of the first and second ready signals.

20. The method defined in claim 19, wherein an output of the first FIFO storage element is coupled to a first register, and wherein an output of the second FIFO storage element is coupled to a second register, the method further comprising:
transmitting the clock signal to clock terminals of the first and second registers; and
in response to assertion of the read enable signal, transmitting the first input stream stored in the first FIFO storage element to the first register and transmitting the second input stream stored in the second FIFO storage element to the second register.

* * * * *